United States Patent
Yoon et al.

(10) Patent No.: US 12,293,847 B2
(45) Date of Patent: May 6, 2025

(54) APPARATUS FOR SATURATING BUFFER MATERIAL AND METHOD FOR SATURATING BUFFER MATERIAL BY USING THE SAME

(71) Applicant: Korea Atomic Energy Research Institute, Daejeon (KR)

(72) Inventors: Seok Yoon, Daejeon (KR); Seung-Hun Park, Incheon (KR); Geon Young Kim, Daejeon (KR); Dong Keun Cho, Sejong-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 902 days.

(21) Appl. No.: 17/383,643

(22) Filed: Jul. 23, 2021

(65) Prior Publication Data
US 2022/0208406 A1   Jun. 30, 2022

(30) Foreign Application Priority Data
Dec. 24, 2020   (KR) ........................ 10-2020-0183794

(51) Int. Cl.
*G21F 7/015*   (2006.01)
*G21F 9/34*    (2006.01)

(52) U.S. Cl.
CPC ................ *G21F 7/015* (2013.01); *G21F 9/34* (2013.01)

(58) Field of Classification Search
CPC ....................................................... G21F 9/34
See application file for complete search history.

(56) References Cited

U.S. PATENT DOCUMENTS 4,581,921 A * 4/1986 Gillespie ................ G01N 15/08
73/73

OTHER PUBLICATIONS

Likos, et al, "Water vapor sorption behavior of smectite-kaolinite mixtures." Clays and Clay Minerals 50.5 (2002): 553-561 (Year: 2002).*

* cited by examiner

*Primary Examiner* — Anthony J Zimmer
*Assistant Examiner* — Eric Scott Sherman
(74) *Attorney, Agent, or Firm* — LEX IP MEISTER, PLLC

(57) ABSTRACT

An apparatus for saturating a buffer material includes a jig for fixing and supporting a buffer material to prevent an increase of a volume of the buffer material. The jig is provided to surround at least a portion of the buffer material. The apparatus further includes a case having a space in which the jig supporting the buffer material is accommodated, a supply unit configured to supply water vapor into the case to adjust a saturation level of the buffer material, and a control unit configured to control the supply unit to stop the supply of water vapor when the saturation level of the buffer material reaches a preset critical saturation level.

4 Claims, 4 Drawing Sheets

APPARATUS FOR SATURATING BUFFER MATERIAL AND METHOD FOR SATURATING BUFFER MATERIAL BY USING THE SAME

CROSS-REFERENCE TO RELATED APPLICATION

This application claims priority to Korean Patent Application No. 10-2020-0183794 filed on Dec. 24, 2020, the entire contents of which are incorporated herein by reference.

TECHNICAL FIELD

The present disclosure relates to an apparatus for saturating a buffer material and a method for saturating a buffer material using the same.

BACKGROUND

In general, high-level radioactive waste separated from spent nuclear fuel is a material with high radiation intensity. The high-level waste needs to be stored in such a manner that damage to people and the environment can be minimized during the process of treatment. Accordingly, the high-level waste is stored hundreds of meters below ground so that it can take at least tens of thousands of years for nuclides to move through a medium such as the ground and be exposed to the human living area upon release of the nuclides, and the high-level waste is stored in a disposal container for a long period of time.

In the conventional deep geological high-level waste repository where the high-level waste is stored, a disposal hole is formed in advance (rock excavation), and a buffer material (compressed soil) is inserted into the disposal hole. Thereafter, after the disposal container containing the high-level waste is inserted between the buffer materials, an additional buffer material is inserted thereinto so as to surround the disposal container.

If such a buffer material is disposed to surround the disposal container, the buffer material prevents groundwater from entering the disposal container and can adsorb to the nuclides that have flowed out of the disposal container. However, the moving speed of the nuclides released from the high-level waste depends on the saturation level of the buffer material, and the thermal-hydro properties of the buffer material also depend on the saturation level of the buffer material. As such, in order to verify the movement of nuclides in the disposal hole and the characteristics of the buffer material, it is necessary to clearly grasp the physical properties according to the saturation level of the buffer material.

Meanwhile, conventionally, in order to prepare a buffer material having a specific saturation level, a particular saturation level was created in a powder state and then compressed to produce a buffer material. However, since the buffer material is compressed after creating a particular saturation level in the powder state, it took much time and cost to prepare a plurality of buffer materials with various saturation levels. In addition, since the saturation level of the buffer material disposed in the actual repository environment continuously increases as the groundwater inflows, there is a need to prepare the buffer material according to the continuous saturation level conditions.

Accordingly, there is a need for the development of an apparatus and a method which are capable of precisely controlling the saturation level of the buffer material while controlling the saturation level of the buffer material within a short period of time.

SUMMARY

An embodiment of the present disclosure is invented based on the above background, and provides an apparatus for saturating a buffer material capable of precisely controlling the saturation level of a buffer material, and a method for saturating a buffer material using the same.

In addition, the present disclosure provides an apparatus for saturating a buffer material capable of minimizing the cost while controlling the saturation level of a buffer material within a short period of time, and a method for saturating a buffer material using the same.

In accordance with a first aspect of the present disclosure, there is provided an apparatus for saturating a buffer material, including: a jig for fixing and supporting a buffer material to prevent an increase of a volume of the buffer material, the jig being provided to surround at least a portion of the buffer material; a case including a space in which the jig supporting the buffer material is accommodated; a supply unit configured to supply water vapor into the case to adjust a saturation level of the buffer material; and a control unit configured to control the supply unit to stop the supply of water vapor when the saturation level of the buffer material reaches a preset critical saturation level.

When a preset time corresponding to the critical saturation level has elapsed from a time at which the supply unit started to operate, the control unit determines that the buffer material has reached the critical saturation level and controls the supply unit to stop the supply of the water vapor.

The jig may include a fixing plate which is brought into contact with at least a portion of a top surface of the buffer material to support the top surface of the buffer material, the fixing plate may include one or more communication holes penetrating through the fixing plate, the water vapor accommodated in the case flowing to the top surface of the buffer material through the one or more communication holes, and the water vapor that has passed through the one or more communication holes may permeate into the top surface of the buffer material.

The apparatus may further include a sensor for measuring a weight of the buffer material in real time. The control unit may be configured to acquire the saturation level of the buffer material based on the weight of the buffer material measured by the sensor, and control the supply unit to stop the supply of the water vapor when the acquired saturation level of the buffer material reaches the preset critical saturation level.

The jig may further include a fixing member which is brought into contact with at least a portion of a bottom surface of the buffer material to support the bottom surface of the buffer material. The fixing member may include one or more through-holes penetrating through the fixing member, the water vapor accommodated in the case flowing to the bottom surface of the buffer material through the one or more through holes. The water vapor that has passed through the one or more through holes may permeate into the bottom surface of the buffer material.

In accordance with a second aspect of the present disclosure, there is provided a method for saturating a buffer material, including: constraining a buffer material by fixing and supporting the buffer material to a jig to prevent an increase of a volume of the buffer material; supplying water vapor toward the jig that supports the buffer material; and controlling a supply unit to stop the supplying the water vapor when a saturation level of the buffer material reaches a preset critical saturation level.

In the controlling, when it is determined that a preset time corresponding to the preset critical saturation level has elapsed from a time at which the supply unit started to operate, the supply unit may be controlled to stop supplying the water vapor.

The jig may include a fixing plate which is brought into contact with at least a portion of a top surface of the buffer material to support the top surface of the buffer material. The fixing plate may include one or more communication holes penetrating through the fixing plate, the water vapor accommodated in the case flowing to the top surface of the buffer material through the one or more communication holes. The water vapor that has passed through the one or more communication holes may permeate into the top surface of the buffer material.

The method may further include measuring a weight of the buffer material in real time. In the controlling, the saturation level of the buffer material may be acquired based on the weight of the buffer material measured in the measuring, and the supplying the water vapor may be stopped when the acquired saturation level of the buffer material reaches the preset critical saturation level.

The jig may further include a fixing member which is brought into contact with at least a portion of a bottom surface of the buffer material to support the bottom surface of the buffer material. The fixing member may include one or more through-holes penetrating through the fixing member, the water vapor accommodated in the case flowing to the bottom surface of the buffer material through the one or more through holes. The water vapor that has passed through the one or more through holes may permeate into the bottom surface of the buffer material.

In an embodiment of the present disclosure, there is provided an effect of precisely controlling the saturation level of a buffer material.

In addition, there is provided an effect of minimizing the cost while controlling the saturation level of a buffer material within a short period of time.

DETAILED DESCRIPTION

Figure 1:
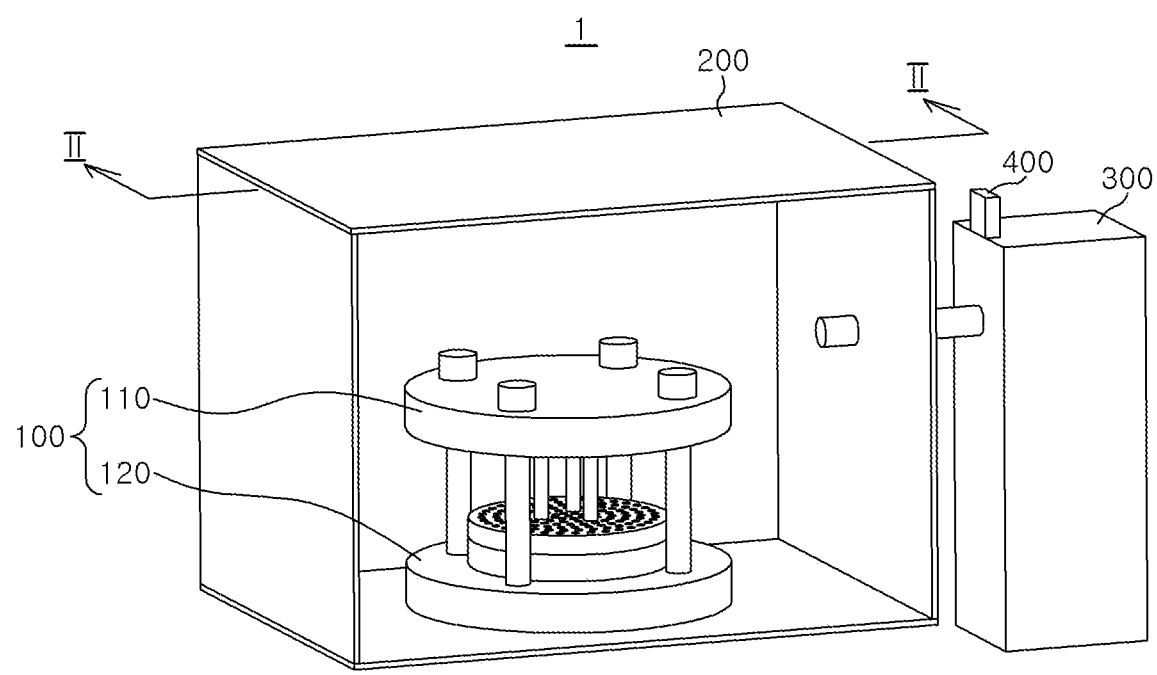
FIG. 1 is a perspective view of an apparatus for saturating a buffer material according to a first embodiment of the present invention.

Hereinafter, specific embodiments for implementing the technical idea of the present invention will be described in detail with reference to the drawings.

However, in describing the present disclosure, detailed descriptions of known configurations or functions may be omitted to clarify the present disclosure.

When an element is referred to as being 'supported' by, 'contacted' with, 'fixed' to or 'flowed' by another element, it should be understood that the element may be directly supported by, contacted with, fixed to or flowed by the other element, but that other elements may exist in the middle.

The terms used in the present disclosure are only used for describing specific embodiments, and are not intended to limit the present disclosure. Singular expressions include plural expressions unless the context clearly indicates otherwise.

Terms including ordinal numbers, such as first and second, may be used for describing various elements, but the corresponding elements are not limited by these terms. These terms are only used for the purpose of distinguishing one element from another element.

In the present specification, it is to be understood that the terms such as "including" are intended to indicate the existence of the certain features, areas, integers, steps, actions, elements and/or combinations thereof disclosed in the specification, and are not intended to preclude the possibility that one or more other certain features, areas, integers, steps, actions, elements and/or combinations thereof may exist or may be added.

As used herein, it should be noted in advance that expressions such as an top surface, a bottom surface, and a side surface are described based on the illustrations in the drawings, and may be expressed differently if the direction of the corresponding object is changed. Meanwhile, as used herein, the vertical direction may be the vertical direction in FIGS. 1 to 3. In addition, the side surface may be a left-right direction in FIGS. 2 and 3.

Hereinafter, a specific configuration of an apparatus 1 for saturating a buffer material according to the first embodiment of the present invention will be described with reference to the drawings.

Figure 2:
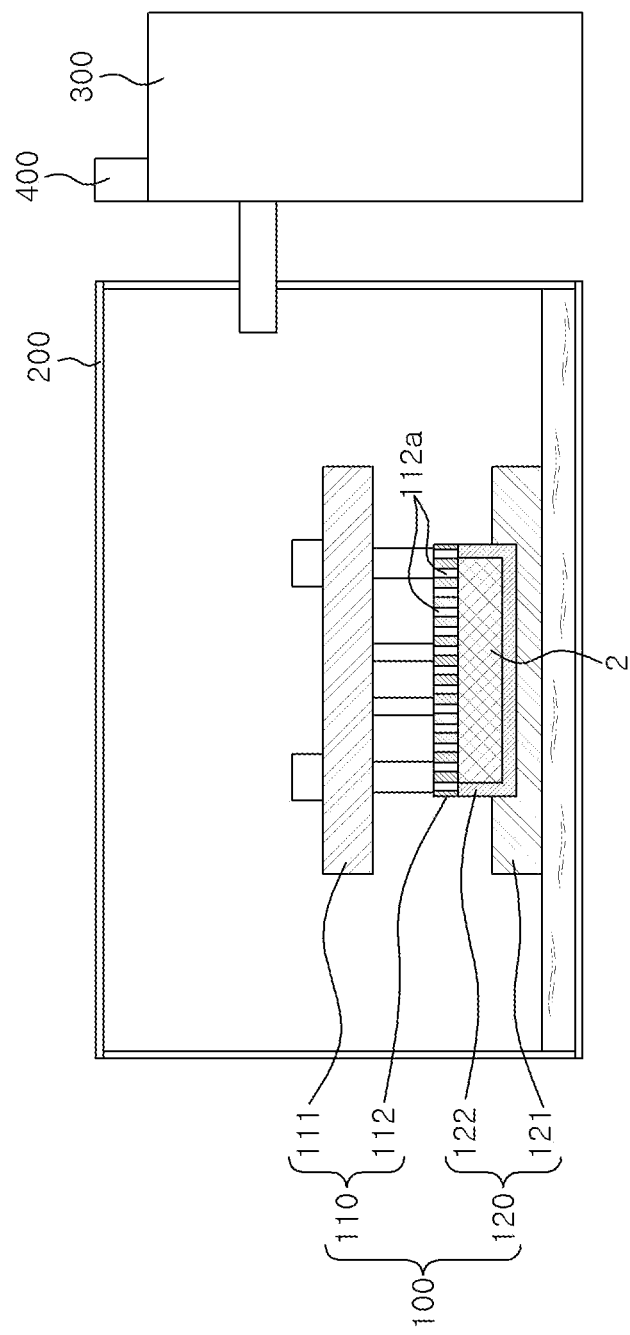
FIG. 2 is a cross-sectional view taken along line II-II of FIG. 1.
Figure 3:
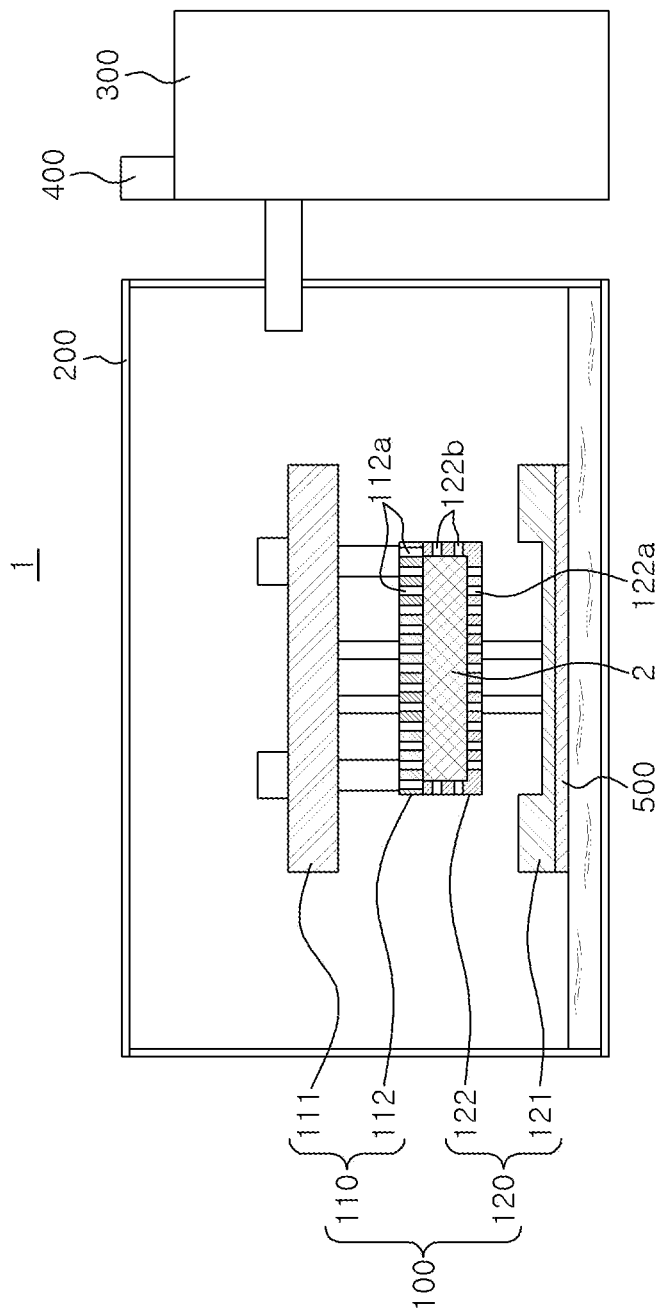
FIG. 3 is a cross-sectional view of an apparatus for saturating a buffer material according to a second embodiment of the present invention.

Hereinafter, referring to FIGS. 1 and 2, a buffer material saturating apparatus 1 according to a first embodiment of the present disclosure may saturate a buffer material 2 to a preset saturation level by supplying water vapor to the buffer material 2. In the first embodiment, the buffer material 2 may include bentonite and it may be provided in the form of compressed soil. The buffer material saturating apparatus 1 may include a jig 100, a case 200, a supply unit 300, and a control unit 400.

The jig 100 may fix and support the buffer material 2 to prevent the buffer material 2 from increasing its volume. The jig 100 may be provided to surround at least a portion of the buffer material 2 to thereby constrain the buffer material 2. For example, the jig 100 may surround all sides of the buffer material 2 to prevent the increase of the volume of the buffer material 2 as the saturation level of the buffer material 2 increases. The jig 100 may include a first fixing unit 110 and a second fixing unit 120.

The first fixing unit 110 may support a top surface of the buffer material 2 at an upper side of the buffer material 2. The first fixing unit 110 may include a first support 111 and a fixing plate 112.

The first support 111 may support the fixing plate 112 at an upper side of the fixing plate 112. The first support 111 and the fixing plate 112 may be spaced apart in a vertical direction so that a communication hole 112a, which will be described later, may be exposed to water vapor.

The fixing plate 112 may support the top surface of the buffer material 2. The fixing plate 112 may be brought into contact with at least a portion of the top surface of the buffer material 2. In addition, one or more communication holes 112a that penetrates the fixing plate 112 may be formed in the fixing plate 112. Accordingly, the water vapor that has passed through the communication holes 112a may be brought into contact with the top surface of the buffer material 2 and may permeate into the top surface of the buffer material 2.

As such, the water vapor may be brought into contact with the top surface of the buffer material 2 through the communication holes 112a to thereby more rapidly control the saturation level of the buffer material 2. In addition, the jig 100 has an effect of being capable of controlling the saturation level of the buffer material 2 while fixing the buffer material 2 with the volume thereof kept.

The second fixing unit 120 may support bottom and side surfaces of the buffer material 2 at a lower side of the buffer material 2. The second fixing unit 120 may include a second support 121 and a fixing member 122.

The second support 121 may support the fixing member 122 at a lower side of the fixing member 122.

The fixing member 122 may support the side and bottom surfaces of the buffer material 2. The fixing member 122 may be brought into contact with at least a portion of the side surface and at least a portion of the bottom surface of the buffer material 2.

A case 200 may provide a space in which the jig 100 is accommodated. The inner space of the case 200 may be sealed and blocked from the outside. In addition, the humidity inside the case 200 may be controlled by a supply unit 300. For example, inside the case 200, a preset amount of water may remain on a bottom of the case 200.

A supply unit 300 may supply water vapor into the case 200 to control the saturation level of the buffer material 2. For example, the saturation level of the buffer material 2 increases continuously while the supply unit 300 supplies water vapor. The operation of the supply unit 300 may be controlled by a control unit 400. Meanwhile, the supply unit 300 has been described as supplying water vapor, but this is only an illustrative example, and the supply unit 300 may also supply dry air. Accordingly, water remaining in the case 200 may be circulated inside the case 200 by dry air to thereby increase the saturation level of the buffer material 2.

A control unit 400 may control the operation of the supply unit 300 to control the saturation level of the buffer material 2. The control unit 400 may stop the operation of the supply unit 300 when the buffer material 2 reaches a critical saturation level. For example, the control unit 400 may operate the supply unit 300 when the jig 100 on which the buffer material 2 is supported is accommodated inside the case 200. In addition, when a preset time from the time point of operation of the supply unit 300 elapses, the control unit 400 may determine that the buffer material 2 has reached the critical saturation level and may thereby control the supply unit 300 to stop supplying water vapor.

In particular, the critical saturation level refers to a saturation level of the buffer material 2 that the user intends to set. That is, the critical saturation level may refer to a saturation level of the buffer material 2 to be controlled. In addition, there may be a plurality of critical saturation levels, and each of the plurality of critical saturation levels may have different times to reach the saturation level. For example, it takes a preset first time for the buffer material 2 to reach a first critical saturation level, and a preset second time for the buffer material 2 to reach a second critical saturation level. As such, it is necessary to operate the supply unit 300 for a given period of time corresponding to each of the plurality of critical saturation levels.

The control unit 400 may be implemented by a computing device including a microprocessor, a measurement device such as a sensor, and a memory. Since the method of the implementation is obvious to those skilled in the art, further detailed description therefor will be omitted herein.

The buffer material saturating apparatus 1 according to the first embodiment of the present disclosure has an effect of enabling the buffer material 2 to reach a critical saturation level more rapidly by supplying water vapor through the supply unit 300. In addition, the apparatus 1 for saturating a buffer material may easily obtain the buffer material 2 having a preset saturation level.

Meanwhile, in addition to this configuration, according to a second embodiment of the present disclosure, the buffer material saturating apparatus 1 may include a sensor 500. Hereinafter, the second embodiment of the present disclosure will be described with further reference to FIG. 3. In describing the second embodiment, differences compared to the first embodiment will be mainly described, and the same description and reference numerals refer to those in the first embodiment.

The sensor 500 may measure the weight of the buffer material 2 in real time, and deliver the measured weight of the buffer material 2 to the control unit 400. For example, the sensor 500 may be a load sensor capable of measuring the weight of the buffer material 2. In addition, the sensor 500 may measure the weight of the buffer material 2 alone or may measure the weights of the buffer material 2 and the jig 100 together. In this case, the weight of the buffer material 2 may be obtained by subtracting the weight of the jig 100 from the summed weight.

The control unit 400 may measure the saturation level of the buffer material 2 based on the weight of the buffer material 2 measured by the sensor. In this case, the control unit 400 may obtain a saturation level (S) of a buffer material in real time based on Equation 1 below:

$$S = Gw/e \qquad \text{(Equation 1)}$$

(wherein "G" is a specific gravity of the buffer material 2, "w" is the water content ratio of the buffer material 2, and "e" is a gap ratio of the buffer material 2).

In particular, the specific gravity "G" and the gap ratio "e" of the buffer material 2 are unique values of the soil, and these values may be obtained from the buffer material 2 before putting it into the buffer material saturating apparatus 1. In addition, the water content "w" of the buffer material 2 may be obtained by measuring the change in weight of the buffer material 2. For example, since the weight of the soil of the buffer material 2 is constant, the weight of the water in the buffer material 2 changes as the saturation level increases. Accordingly, the change in the weight of the buffer material 2 corresponds to the change in the weight of water, and from this, the water content ratio of the buffer material 2 may be obtained.

In addition, the control unit 400 may compare the saturation level and the critical saturation level of the buffer material 2 obtained, and it may determine whether the buffer material 2 has reached the critical saturation level. For example, the control unit 400 may control the supply unit 300 to stop supply of water vapor when it is determined that the buffer material 2 has reached a critical saturation level.

As such, the control unit 400 has the effect of more precisely controlling the saturation level of the buffer material 2 by obtaining the saturation level of the buffer material 2 in real time. In addition, the buffer material 2 having a specific saturation level may be used in an experiment to measure thermal conductivity and moisture absorption.

Meanwhile, first through holes 122*a* and second through holes 122*b* may be formed in the fixing member 122 according to the second embodiment of the present invention.

The first through holes 122*a* may be formed in a portion of the fixing member 122, where it surrounds the bottom surface of the buffer material 2. In addition, the first through holes 122*a* may be formed so that they may penetrate the fixing member 122 in a vertical direction. Accordingly, the water vapor that has passed through the first through holes 122*a* may be brought into contact with the bottom surface of the buffer material 2 and may permeate into the bottom surface of the buffer material 2.

The second through holes 122*b* may be formed in a portion of the fixing member 122, where it surrounds the side surface of the buffer material 2. In addition, the second through holes 122*b* may be formed so that they may penetrate the fixing member 122 in a lateral direction. Accordingly, the water vapor that has passed through the second through holes 122*b* may be brought into contact with the side surface of the buffer material 2 and may permeate into the side surface of the buffer material 2.

The fixing member 122 may be upwardly spaced apart from the second support 121 so that the first through holes 122*a* may be exposed to water vapor.

As such, by allowing water vapor to penetrate the bottom and side surfaces of the buffer material 2 through the first through holes 122*a* and the second through holes 122*b* as well as the top surface of the buffer material 2, it is possible to more rapidly control the saturation level of the buffer material 2.

Figure 4:
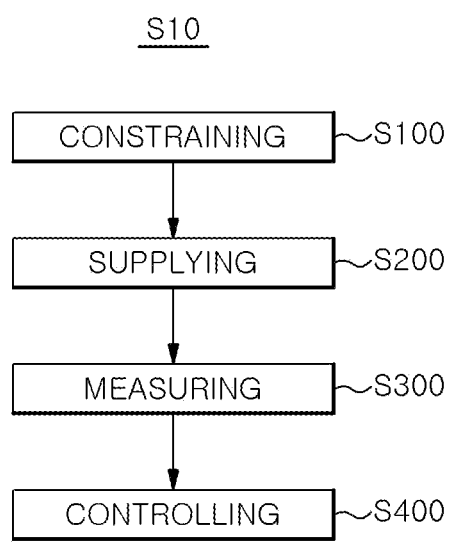
FIG. 4 is a flowchart schematically illustrating a method for saturating a buffer material according to the first and second embodiments of the present invention.

Hereinafter, referring to FIG. 4, a method S10 for saturating the buffer material 2 using the apparatus 1 according to the first and second embodiments of the present disclosure will be described.

In the buffer material saturating method S10, the buffer material 2 may be saturated to a preset saturation level by supplying water vapor to the buffer material 2. The buffer material saturating method S10 may include a constraining step S100, a supplying step S200, a measuring step S300, and a controlling step S400.

In the constraining step S100, the buffer material 2 may be fixed and supported by the jig 100 to prevent an increase of the volume of the buffer material 2. In other words, the buffer material 2 may be constrained through the jig 100. The jig 100 on which the buffer material 2 is supported may be transported into the case 200.

In the supplying step S200, water vapor may be supplied into the case 200. That is, in the supplying step S200, the supply unit 300 may supply water vapor toward the jig 100 on which the buffer material 2 is supported. In addition, the water vapor flowing through the inner space of the case 200 may permeate into the top, bottom, and side surfaces of the buffer material 2 through the communication holes 112*a*, the first through holes 122*a*, and the second through holes 122*b*. Accordingly, the saturation level of the buffer material 2 may be increased.

In the measuring step S300, the sensor 500 may measure the weight of the buffer material 2 in real time. The weight of the buffer material 2 measured in the measuring step S300 may be delivered to the control unit 400.

In the controlling step S400, the supply unit 300 may be controlled to stop the supply of water vapor when the saturation level of the buffer material 2 reaches a critical saturation level. For example, in the controlling step S400, when it is determined that a preset time corresponding to the critical saturation level has passed from the time point of operation of the supply unit 300, the supply unit 300 may be controlled to stop the supply of water vapor.

In another embodiment, in the controlling step S400, the supply unit 300 may be controlled to stop the supply of water vapor based on the saturation level of the buffer material 2 regardless of the time during which the supply unit 300 is operated. In a more specific embodiment, in the controlling step S400, the saturation level of the buffer material 2 may be obtained based on the weight of the buffer material 2. In other words, in the controlling step S400, the saturation level S of the buffer material may be obtained in real time based on the measured weight of the buffer material 2 and Equation 1 below:

$$S = Gw/e \qquad \text{(Equation 1)}$$

(wherein "G" is the specific gravity of the buffer material 2, "w" is the water content ratio of the buffer material 2, and "e" is the gap ratio of the buffer material 2).

Meanwhile, when the acquired saturation level is lower than the critical saturation level, the supply unit 300 is controlled to continue to operate even after a preset time elapses. However, when the acquired saturation level reaches the critical saturation level, the supply unit 300 is controlled to be stopped even if a preset time has not elapsed. As such, in the step S400 of control, the supply unit 300 may be controlled based on the acquired saturation level.

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art may easily change or modify the disclosed embodiments based on the present specification, and it is clear that such changes or modifications also belong to the scope of the present disclosure.

What is claimed is:

1. An apparatus for saturating a buffer material, comprising:
   a jig for fixing and supporting a buffer material to prevent an increase of a volume of the buffer material, the jig being provided to surround at least a portion of the buffer material;
   a case including a space in which the jig supporting the buffer material is accommodated;
   a supply unit configured to supply water vapor into the case to adjust a saturation level of the buffer material; and
a control unit configured to control the supply unit to stop the supply of water vapor when the saturation level of the buffer material reaches a preset critical saturation level,
   wherein the jig includes a fixing plate which is brought into contact with at least a portion of a top surface of the buffer material to support the top surface of the buffer material, and
   wherein the fixing plate includes plural communication holes penetrating through the fixing plate, and the water vapor accommodated in the case flows onto the top surface of the buffer material through the plural communication holes, so that the water vapor permeates into the top surface of the buffer material.

2. The apparatus of claim 1, wherein when a preset time corresponding to the critical saturation level has elapsed from a time at which the supply unit started to operate, the control unit determines that the buffer material has reached the critical saturation level and controls the supply unit to stop the supply of the water vapor.

3. The apparatus of claim 1, further comprising: a sensor for measuring a weight of the buffer material in real time,
   wherein the control unit is configured to acquire the saturation level of the buffer material based on the weight of the buffer material measured by the sensor, and control the supply unit to stop the supply of the water vapor when the acquired saturation level of the buffer material reaches the preset critical saturation level.

4. The apparatus of claim 1, wherein the jig further includes a fixing member which is brought into contact with at least a portion of a bottom surface of the buffer material to support the bottom surface of the buffer material,
   wherein the fixing member includes one or more through-holes penetrating through the fixing member, the water vapor accommodated in the case flowing to the bottom surface of the buffer material through the one or more through holes, and
   wherein the water vapor that has passed through the one or more through holes permeates into the bottom surface of the buffer material.

* * * * *